United States Patent
Ouyang et al.

(10) Patent No.: US 9,325,080 B2
(45) Date of Patent: Apr. 26, 2016

(54) ELECTRONIC DEVICE WITH SHARED ANTENNA STRUCTURES AND BALUN

(71) Applicant: Apple Inc., Cupertino, CA (US)

(72) Inventors: Yuehui Ouyang, Sunnyvale, CA (US); Dean F. Darnell, Durham, NC (US); Enrique Ayala Vazquez, Watsonville, CA (US); Erica J. Tong, Pacifica, CA (US); Hongfei Hu, Santa Clara, CA (US); Matthew A. Mow, Los Altos, CA (US); Mattia Pascolini, San Mateo, CA (US); Ming-Ju Tsai, Cupertino, CA (US); Nanbo Jin, Sunnyvale, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 14/195,130

(22) Filed: Mar. 3, 2014

(65) Prior Publication Data
US 2015/0249292 A1 Sep. 3, 2015

(51) Int. Cl.
*H01Q 1/24* (2006.01)
*H01Q 21/30* (2006.01)
*H01Q 1/48* (2006.01)
*H01Q 9/42* (2006.01)
(Continued)

(52) U.S. Cl.
CPC .............. *H01Q 21/30* (2013.01); *H01Q 1/243* (2013.01); *H01Q 1/48* (2013.01); *H01Q 5/35* (2015.01); *H01Q 5/371* (2015.01); *H01Q 9/42* (2013.01)

(58) Field of Classification Search
CPC ..... H01Q 1/243; H01Q 9/0421; H01Q 21/30; H01Q 5/335; H01Q 5/371; H01Q 5/50; H01Q 1/2283; H01Q 21/29
USPC .......................... 343/702, 700 MS, 745, 767
See application file for complete search history.

(56) References Cited

U.S. PATENT DOCUMENTS

| | | | | |
|---|---|---|---|---|
| 5,936,583 A | * | 8/1999 | Sekine | H01Q 1/245 343/702 |
| 6,600,450 B1 | * | 7/2003 | Efanov | H01Q 1/243 343/700 MS |

(Continued)

FOREIGN PATENT DOCUMENTS

| | | |
|---|---|---|
| EP | 2498336 | 9/2012 |
| EP | 2528165 | 11/2012 |

(Continued)

*Primary Examiner* — Linh Nguyen
(74) *Attorney, Agent, or Firm* — Treyz Law Group, P.C.; G. Victor Treyz; Michael H. Lyons

(57) ABSTRACT

An electronic device may be provided with shared antenna structures that can be used to form both a near-field-communications antenna such as a loop antenna and a non-near-field communications antenna such as an inverted-F antenna. The antenna structures may include conductive structures such as metal traces on printed circuits or other dielectric substrates, internal metal housing structures, or other conductive electronic device housing structures. A main resonating element arm may be separated from an antenna ground by an opening. A non-near-field communications antenna return path and antenna feed path may span the opening. A balun may have first and second electromagnetically coupled inductors. The second inductor may have terminals coupled across differential signal terminals in a near-field communications transceiver. The first inductor may form part of the near-field communications loop antenna.

21 Claims, 9 Drawing Sheets

(51) Int. Cl.
*H01Q 5/35* (2015.01)
*H01Q 5/371* (2015.01)

(56) References Cited

U.S. PATENT DOCUMENTS

| | | | |
|---|---|---|---|
| 7,408,515 B2* | 8/2008 | Leisten | H01Q 9/0421 343/702 |
| 7,423,606 B2 | 9/2008 | Knadle, Jr. et al. | |
| 7,505,001 B2* | 3/2009 | Deavours | G06K 19/07749 340/572.7 |
| 7,772,941 B2* | 8/2010 | Yeung | H01P 5/1015 333/238 |
| 7,843,347 B2 | 11/2010 | Nikitin et al. | |
| 7,873,385 B2 | 1/2011 | Boireau et al. | |
| 7,973,722 B1 | 7/2011 | Hill et al. | |
| 8,041,227 B2 | 10/2011 | Holcombe et al. | |
| 8,238,825 B2 | 8/2012 | Rofougaran et al. | |
| 8,369,959 B2 | 2/2013 | Meskens | |
| 8,417,296 B2 | 4/2013 | Caballero et al. | |
| 8,432,322 B2 | 4/2013 | Amm et al. | |
| 8,466,839 B2 | 6/2013 | Schlub et al. | |
| 8,577,289 B2 | 11/2013 | Schlub et al. | |
| 8,606,215 B2 | 12/2013 | Sharma | |
| 2006/0055618 A1* | 3/2006 | Poilasne | H01Q 1/241 343/866 |
| 2007/0279287 A1* | 12/2007 | Castaneda | H01Q 1/2266 343/700 MS |
| 2008/0081631 A1 | 4/2008 | Rofougaran | |
| 2009/0058735 A1* | 3/2009 | Hill | H01Q 1/243 343/702 |
| 2009/0073070 A1* | 3/2009 | Rofougaran | H04B 5/0012 343/793 |
| 2009/0143028 A1 | 6/2009 | Kim | |
| 2009/0180451 A1 | 7/2009 | Alpert et al. | |
| 2010/0007568 A1* | 1/2010 | Fear | H01P 5/10 343/772 |
| 2010/0222010 A1 | 9/2010 | Ozaki et al. | |
| 2010/0279734 A1 | 11/2010 | Karkinen et al. | |
| 2011/0148733 A1* | 6/2011 | Fahs | H01F 17/0006 343/859 |
| 2011/0241949 A1 | 10/2011 | Nickel et al. | |
| 2011/0243120 A1 | 10/2011 | Ginsburg et al. | |
| 2012/0135681 A1 | 5/2012 | Adams et al. | |
| 2012/0258660 A1 | 10/2012 | Rajendran et al. | |
| 2013/0017867 A1 | 1/2013 | Lee et al. | |
| 2013/0109433 A1 | 5/2013 | Wang et al. | |
| 2013/0189923 A1 | 7/2013 | Lewin | |
| 2013/0194139 A1* | 8/2013 | Nickel | H01Q 5/328 343/703 |
| 2013/0217342 A1 | 8/2013 | Abdul-Gaffoor et al. | |
| 2013/0231046 A1 | 9/2013 | Pope et al. | |
| 2013/0241796 A1 | 9/2013 | Nagumo | |
| 2014/0045442 A1 | 2/2014 | Caruana et al. | |
| 2014/0062812 A1 | 3/2014 | Smith et al. | |
| 2014/0128032 A1 | 5/2014 | Muthukumar | |
| 2014/0139380 A1 | 5/2014 | Ouyang et al. | |
| 2014/0306857 A1* | 10/2014 | Bevelacqua | H01Q 1/243 343/750 |
| 2014/0315592 A1 | 10/2014 | Schlub et al. | |
| 2015/0249292 A1 | 9/2015 | Ouyang et al. | |
| 2015/0249485 A1 | 9/2015 | Ouyang et al. | |
| 2015/0303568 A1 | 10/2015 | Yarga et al. | |
| 2015/0311579 A1 | 10/2015 | Irci et al. | |

FOREIGN PATENT DOCUMENTS

| | | |
|---|---|---|
| EP | 2618497 | 7/2013 |
| KR | 2012-0103297 A | 9/2012 |
| TW | 201240379 | 10/2012 |
| WO | 2012127097 | 9/2012 |
| WO | 2013147823 | 10/2013 |

\* cited by examiner

ELECTRONIC DEVICE WITH SHARED ANTENNA STRUCTURES AND BALUN

BACKGROUND

This relates to electronic devices, and more particularly, to antennas for electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry such as near-field communications circuitry. Near-field communications schemes involve electromagnetically coupled communications over short distances, typically 20 cm or less.

To satisfy consumer demand for small form factor wireless devices, manufacturers are continually striving to implement wireless communications circuitry such as antenna components using compact structures. At the same time, there is a desire for wireless devices to cover a growing number of communications bands. For example, it may be desirable for a wireless device to cover a near-field communications band while simultaneously covering additional non-near-field (far field) bands such cellular telephone bands, wireless local area network bands, and satellite navigation system bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

An electronic device may be provided with antenna structures that form both a near-field-communications antenna such as a loop antenna and a non-near-field communications antenna such as an inverted-F antenna. A non-near-field communications circuit such as a cellular telephone transceiver, wireless local area network transceiver, or other non-near-field communications transceiver may wirelessly communicate using the non-near-field communications antenna. A near-field communications transceiver may wirelessly communicate using the near-field communications antenna. By sharing portions of the antenna structures between the non-near-field communications antenna and the near-field communications antenna, space in the electronic device may be conserved.

The antenna structures may include conductive structures such as metal traces on printed circuits or other dielectric substrates, internal metal housing structures, or conductive peripheral electronic device housing structures. A main resonating element arm may be separated from an antenna ground by an opening. A non-near-field communications antenna return path and antenna feed path may span the opening. The main resonating element arm, the return path, the feed path, and the antenna ground may form a non-near-field communications antenna such as an inverted-F antenna. The non-near-field communications transceiver may be coupled to the antenna feed path of the inverted-F antenna.

A balun may have first and second electromagnetically coupled inductors. The second inductor may have terminals coupled across differential signal terminals in a near-field communications transceiver. The first inductor may form part of the near-field communications loop antenna, so that the balun couples the non-near-field communications transceiver to the loop antenna. The loop antenna may include portions of the antenna ground, portions of the antenna resonating element arm in the non-near-field communications antenna, portions of the antenna return path in the non-near-field communications antenna, portions of the antenna feed in the non-near-field communications antenna, portions of an antenna tuning path in the non-near-field communications antenna, or other signal paths in the antenna structures.

DETAILED DESCRIPTION

Electronic devices may be provided with wireless circuitry. The wireless circuitry may include near-field communications circuitry. For example, a near-field communications transmitter-receiver ("transceiver") may use a near-field communications antenna to transmit and receive near-field electromagnetic signals at a frequency such as 13.56 MHz. Near-field communications schemes involve near-field electromagnetic coupling between near-field antennas that are separated by a relatively small distance (e.g., 20 cm or less). The near-field communications antennas may be loop antennas. The wireless circuitry may also include cellular network transceiver circuitry, wireless local area network transceiver circuitry, satellite navigation system circuitry, or other non-near-field communications circuitry. The non-near-field communications circuitry can use an antenna to handle radio-frequency signals at frequencies of 700 MHz to 2700 MHz, 5 GHz, or other suitable frequencies.

To conserve space within an electronic device, a near-field communications antenna and a non-near-field communications antenna can be formed from shared antenna structures. For example, conductive electronic device housing structures, metal traces on printed circuits and other substrates, and other conductive structures in an electronic device may be configured to serve both as a non-near-field antenna and as a near-field antenna.

Figure 1:
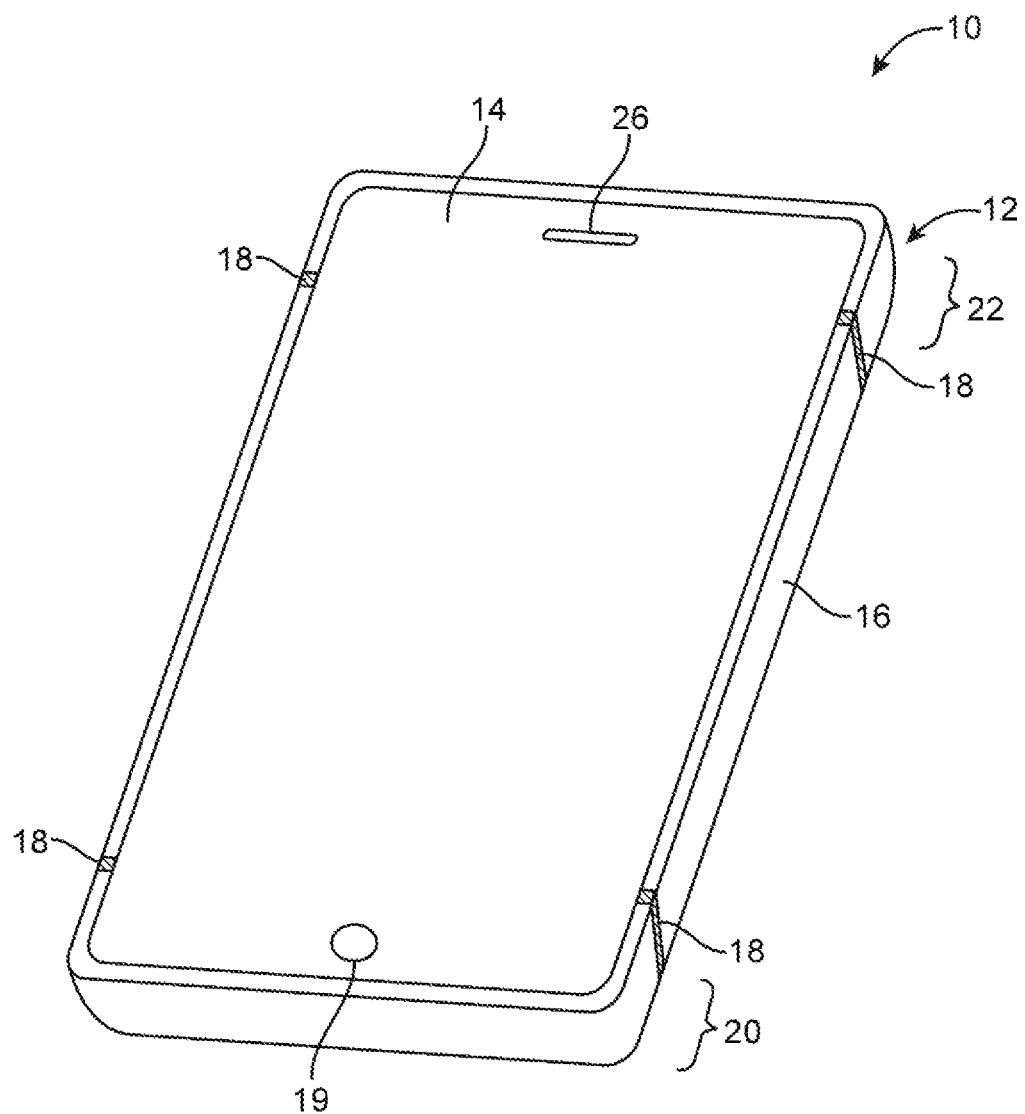
FIG. 1 is a perspective view of an illustrative electronic device with wireless communications circuitry in accordance with an embodiment.

FIG. 1 is a perspective view of an illustrative electronic device of the type that may be provided with wireless circuitry having antenna structures that are shared between near-field communications circuitry and non-near-field communications circuitry. The wireless communications circuitry may be used to support wireless communications in multiple wireless communications bands. The wireless communications circuitry may include antenna structures that include loop antennas, inverted-F antennas, strip antennas, planar inverted-F antennas, slot antennas, hybrid antennas that include antenna structures of more than one type, or other suitable antennas.

Antenna structures may, if desired, be formed from conductive electronic device structures. The conductive electronic device structures may include conductive housing structures. The housing structures may include a peripheral conductive member or other conductive peripheral electronic device housing structures running around the periphery of an electronic device. The peripheral conductive housing structures may serve as a bezel for a planar structure such as a display and/or may form vertical sidewalls for the device.

The antenna structures may be configured to handle both near-field communications (e.g., communications in a near-field communications band such as a 13.56 MHz band or other near-field communications band) and non-near-field communications (sometimes referred to as far field communications) such as cellular telephone communications, wireless local area network communications, and satellite navigation system communications. Near-field communications typically involve communication distances of less than about 20 cm and involve magnetic (electromagnetic) near-field coupling between near-field antennas such as loop antennas. Far field communications typically involved communication distances of multiple meters or miles.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, a television, a computer monitor, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A display cover layer such as a cover glass layer or a layer of clear plastic may cover the surface of display 14. Buttons such as button 19 may pass through openings in the display cover layer or other outer layer in display 14. The cover glass may also have other openings such as an opening for speaker port 26.

Housing 12 may include peripheral conductive housing structures 16 such as a metal member or other conductive member. Peripheral conductive housing structures 16 may run around the periphery of device 10 and display 14. In configurations in which device 10 and display 14 have rectangular shapes, peripheral conductive housing structures 16 may have a rectangular ring shape (as an example). Peripheral conductive housing structures 16 or part of peripheral conductive housing structures 16 may serve as a bezel for display 14 (e.g., a cosmetic trim that surrounds all four sides of display 14 and/or helps hold display 14 to device 10). Peripheral conductive housing structures 16 may also, if desired, form sidewall structures for device 10 (e.g., by forming a band with vertical sidewalls, by forming a band with rounded sidewalls, etc.). If desired, peripheral conductive housing structures 16 such as housing sidewalls may be formed as integral portions of a metal rear housing wall for device 10 (i.e., the rear surface and edges of housing 12 may be formed from a conductive material such as metal).

Peripheral conductive housing structures 16 may include a peripheral conductive member such as a peripheral metal member, a peripheral metal housing band, or other peripheral conductive housing member, may include a metal display bezel, may include metal housing sidewalls, or may include other peripheral conductive housing structures. Peripheral conductive housing structures 16 (e.g., a metal member) may be formed from a metal such as stainless steel, aluminum, or other suitable materials. One, two, three, or more than three separate structures may be used in forming a peripheral conductive housing member or metal sidewalls may be separated into one, two, three, or more than three sidewall segments.

It is not necessary for peripheral conductive housing structures 16 to have a uniform cross-section. For example, the top (front face) portion of peripheral conductive housing structures 16 may, if desired, have an inwardly protruding lip that helps hold display 14 in place. If desired, the bottom portion of peripheral conductive housing structures 16 may also have an enlarged lip (e.g., in the plane of the rear surface of device 10). In the example of FIG. 1, structures 16 have substantially straight vertical sidewalls. This is merely illustrative. Sidewalls in housing 12 may be curved or may have any other suitable shape. In some configurations (e.g., when structures 16 serve as a bezel for display 14), structures 16 may run around the lip of housing 12 (i.e., structures 16 may cover only the edge of housing 12 that surrounds display 14 and not the rear edge of housing 12 of the sidewalls of housing 12).

Display 14 may include conductive structures such as an array of capacitive touch sensor electrodes, conductive lines for addressing display pixel elements, driver circuits, etc. Housing 12 may include internal structures such as metal frame members, a planar sheet metal housing structure (sometimes referred to as a midplate) that spans the walls of housing 12 (i.e., a substantially rectangular member that is welded or otherwise connected between opposing sides of structures 16), printed circuit boards, and other internal conductive structures. These conductive structures may be located in the center of housing 12 under display 14 (as an example).

In regions 22 and 20, openings (gaps) may be formed within the conductive structures of device 10 (e.g., between peripheral conductive housing structures 16 and opposing conductive structures that may form an antenna ground such as conductive housing structures, a conductive ground plane associated with a printed circuit board, and conductive electrical components in device 10). These openings may be filled with air, plastic, and other dielectrics. Conductive housing structures and other conductive structures in device 10 may serve as a ground plane for antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element arm from the ground plane, or may otherwise serve as part of antenna structures formed in regions 20 and 22.

In general, device 10 may include any suitable number of antennas (e.g., one or more, two or more, three or more, four or more, etc.). The antennas in device 10 may be located at opposing first and second ends of an elongated device housing, along one or more edges of a device housing, in the center of a device housing, in other suitable locations, or in one or more of such locations. The arrangement of FIG. 1 is merely illustrative.

Portions of peripheral conductive housing structures 16 may be provided with gap structures. For example, peripheral conductive housing structures 16 may be provided with one or more gaps such as gaps 18, as shown in FIG. 1. The gaps may be filled with dielectric such as polymer, ceramic, glass, air, other dielectric materials, or combinations of these materials. Gaps 18 may divide peripheral conductive housing structures 16 into one or more peripheral conductive housing structure (member) segments. There may be, for example, two segments of a peripheral conductive housing member or other peripheral conductive housing structures 16 (e.g., in an arrangement with two gaps), three segments (e.g., in an arrangement with three gaps), four segments (e.g., in an arrangement with four gaps, etc.). The segments of the peripheral conductive housing member or other peripheral conductive housing structures that are formed in this way may form parts of antennas in device 10.

If desired, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting non-near-field-communications such as local area network communications, voice and data cellular telephone communications, global positioning system (GPS) communications or other satellite navigation system communications, Bluetooth® communications, etc. Device 10 may use at least part of the same antenna structures for supporting near-field communications (e.g., communications at 13.56 MHz).

Figure 2:
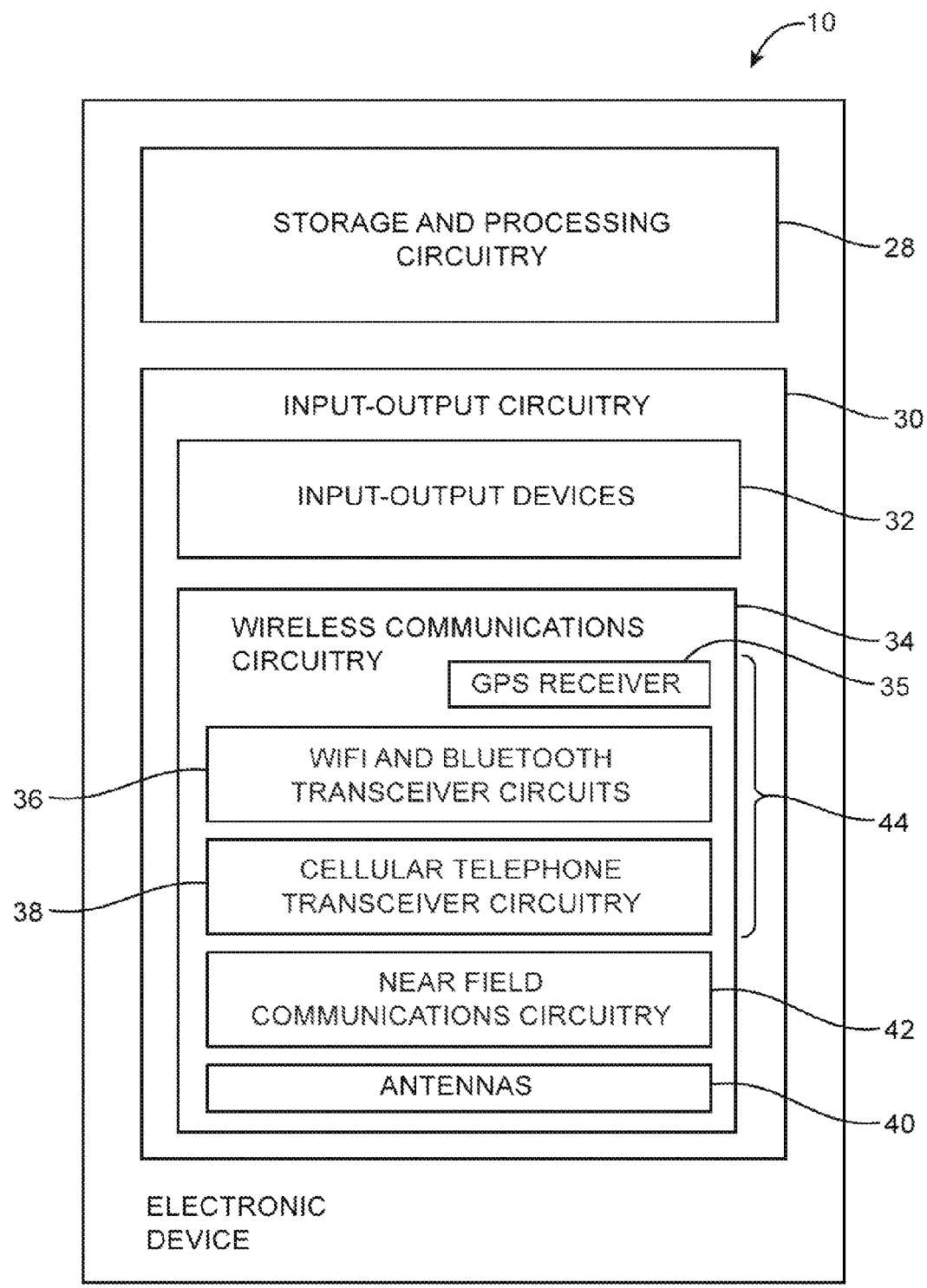
FIG. 2 is a schematic diagram of an illustrative electronic device with wireless communications circuitry in accordance with an embodiment.

A schematic diagram of an illustrative configuration that may be used for electronic device 10 is shown in FIG. 2. As shown in FIG. 2, electronic device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, near-field communications protocols, etc.

Circuitry 28 may be configured to implement control algorithms that control the use of antennas in device 10. For example, circuitry 28 may perform signal quality monitoring operations, sensor monitoring operations, and other data gathering operations and may, in response to the gathered data and information on which communications bands are to be used in device 10, control which antenna structures within device 10 are being used to receive and process data and/or may adjust one or more switches, tunable elements, or other adjustable circuits in device 10 to adjust antenna performance. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, may tune an antenna to cover a desired communications band, may perform time-division multiplexing operations to share antenna structures between near-field and non-near-field communications circuitry, etc. In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems.

Wireless local area network transceiver circuitry 36 in wireless communications circuitry 34 may handle 2.4 GHz and 5 GHz bands for WiFi® (IEEE 802.11) communications and may handle the 2.4 GHz Bluetooth® communications band.

Circuitry 34 may use cellular telephone transceiver circuitry 38 for handling wireless communications in cellular telephone bands such as bands in frequency ranges of about 700 MHz to about 2700 MHz or bands at higher or lower frequencies.

Wireless communications circuitry 34 may include near-field communications circuitry 42. Near-field communications circuitry 42 may handle near-field communications at frequencies such as the near-field communications frequency of 13.56 MHz or other near-field communications frequencies of interest.

Circuitry 44 such as satellite navigation system receiver circuitry 35, wireless local area network transceiver circuitry 36, and cellular telephone transceiver circuitry 38 that does not involve near-field communications may sometimes be referred to as non-near-field communications circuitry or far field communications circuitry.

Antenna structures 40 may be shared by non-near-field communications circuitry 44 and near-field communications circuitry 42.

If desired, communications circuitry 34 may include circuitry for other short-range and long-range wireless links. For example, wireless communications circuitry 34 may include wireless circuitry for receiving radio and television signals, paging circuits, etc. In near-field communications, wireless signals are typically conveyed over distances of less than 20 cm. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antenna structures 40. Antenna structures 40 may include one or more antennas. Antennas structures 40 may be formed using any suitable antenna types. For example, antenna structures 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

To accommodate near-field communications within the potentially tight confines of device housing 12, antenna structures 40 may be shared between non-near-field communications circuitry 44 and near-field communications circuitry 42. When, for example, it is desired to transmit and receive cellular telephone signals or other non-near-field communications, antenna structures 40 may be used by cellular telephone transceiver circuitry 38 or other non-near-field transceiver circuitry 44. When it is desired to transmit and receive near-field communications signals, antenna structures 40 may be used by near-field communications circuitry 42.

Figure 3:
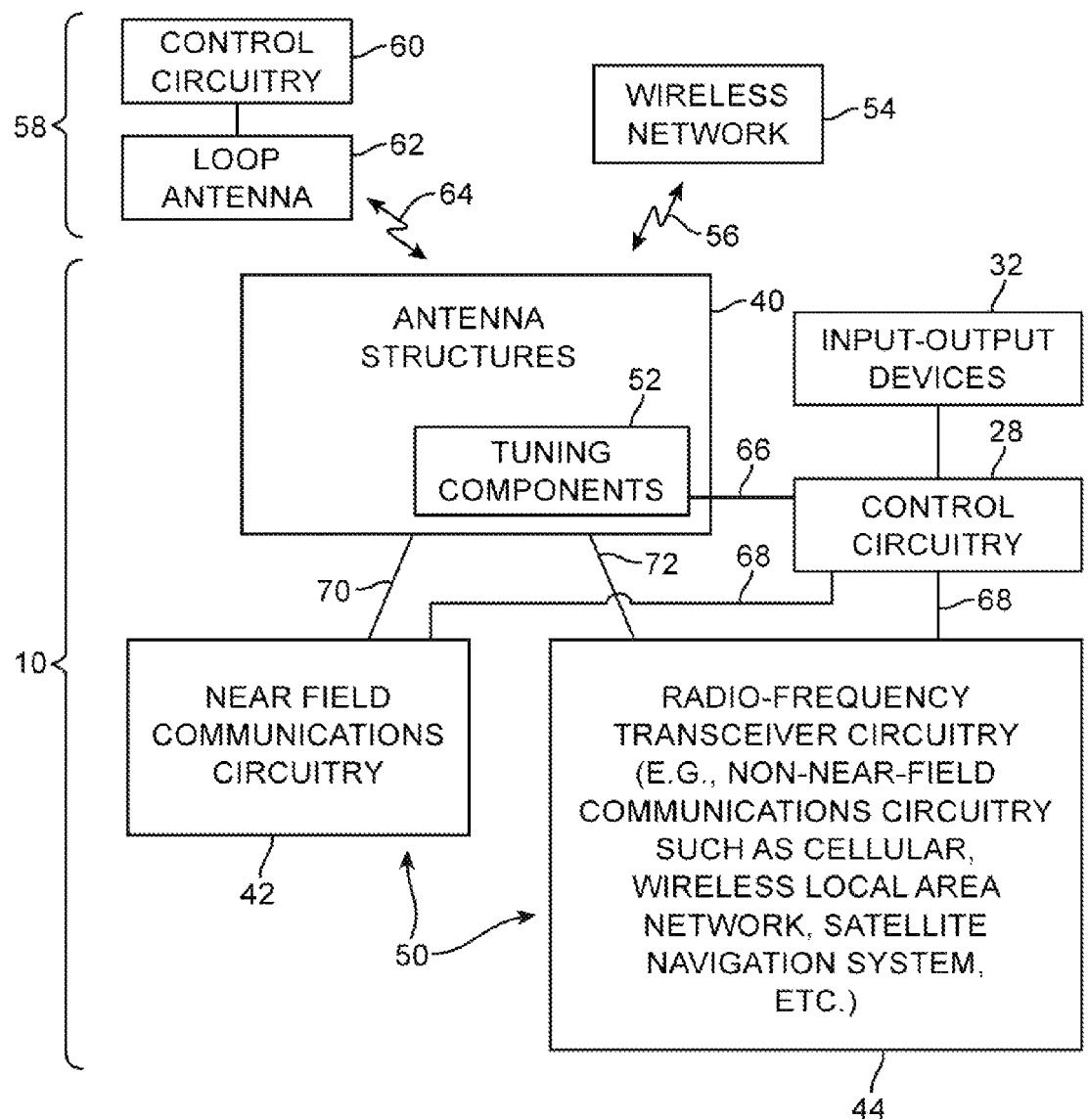
FIG. 3 is a diagram of a system in which antenna structures in an electronic device are being used to wirelessly communicate with external electrical equipment using near-field communications and non-near-field communications in accordance with an embodiment.

FIG. 3 is a schematic diagram showing how antenna structures 40 may be shared by near-field communications circuitry 42 and non-near-field communications circuitry 44. As shown in FIG. 3, electronic device 10 includes control circuitry 28 and input-output devices 32. Control circuitry 28 may use input-output devices 32 to provide output to a user and to receive input. Control circuitry 28 may use wireless transceiver circuitry 50 and antenna structures 40 to communicate with external equipment over one or more wireless communications bands including bands for non-near-field communications and near-field communications.

Near-field communications circuitry 42 and non-near-field communications circuitry 44 may be coupled to antenna structures 40. Near-field communications circuitry 42 (e.g., a near-field communications transceiver) uses antenna structures 40 to communicate with external near-field communications equipment 58 over near-field communications link 64. Non-near-field communications circuitry such as radio-frequency transceiver circuitry 44 uses antenna structures 40 to communicate with a cellular telephone network, a wireless local area network, or other far field (non-near-field) wireless network equipment 54 over non-near-field communications wireless link 56.

External equipment such as external equipment 58 may communicate with near-field communications circuitry 42 via magnetic induction. Equipment 58 may include a loop antenna such as loop antenna 62 that is controlled by control circuitry 60. Loop antenna 62 and a loop antenna formed from antenna structures 40 may be electromagnetically coupled to support near-field wireless communications when loop antenna 62 and the loop antenna in structures 40 are within an appropriately close distance of each other such as 20 cm or less, as indicated by near-field communications signals 64 of FIG. 3.

Device 10 may use near-field communications circuitry 42 and antenna structures 40 (e.g., the near-field communications loop antenna portion of antenna structures 40) to communicate with external near-field communications equipment 58 using passive or active communications. In passive communications, device 10 may use near-field communications circuitry 42 and antenna structures 40 to modulate electromagnetic signals 64 from equipment 58. In active communications, near-field communications circuitry 42 and antenna structures 40 may transmit radio-frequency electromagnetic signals 64 to external equipment 58.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna).

If desired, antenna structures 40 may be provided with adjustable circuits such as tunable circuitry 52. Tunable circuitry 52 may be controlled by control signals from control circuitry 28. For example, control circuitry 28 may supply control signals to tunable circuitry 52 via control path 66 during operation of device 10 whenever it is desired to tune antenna structures 40 to cover a desired communications band (e.g., a desired non-near-field communications band). Paths 68 may be used to convey data between control circuitry 28 and transceiver circuitry 50.

Passive filter circuitry in antenna structures 40 may help antenna structures 40 exhibit antenna resonances in communications bands of interest (e.g., passive filter circuitry in antenna structures 40 may short together different portions of antenna structures 40 and/or may form open circuits or pathways of other impedances between different portions of antenna structures 40 to ensure that desired antenna resonances are produced).

Transceiver circuitry 50 may be coupled to antenna structures 40 by signal paths such as signal paths 70 and 72. Signal paths 70 and 72 may include transmission lines, portions of conductive housing structures, ground plane structures, traces on printed circuits, or other conductive paths.

Impedance matching circuitry formed from components such as inductors, resistors, and capacitors may be used in matching the impedance of antenna structures 40 to the impedance of transmission line structures coupled to antenna structures 40. Filter circuitry may also be provided in the transmission line structures and/or antenna structures 40. Matching network components may be provided as discrete components (e.g., surface mount technology components) or may be formed from housing structures, printed circuit board structures, traces on plastic supports, etc. Components such as these may also be used in forming passive filter circuitry in antenna structures 40 and tunable circuitry 52 in antenna structures 40.

A transmission line may be coupled between transceiver 44 and antenna feed structures associated with antenna structures 40. As an example, antenna structures 40 may form a non-near-field communications antenna such as an inverted-F antenna having an antenna feed with a positive antenna feed terminal and a ground antenna feed terminal. A positive transmission line conductor may be coupled to the positive antenna feed terminal and a ground transmission line conductor may be coupled to the ground antenna feed terminal. Other types of antenna feed arrangements may be used to couple non-near-field communications transceiver 44 to antenna structures 40 if desired.

Near-field communications circuitry 42 may be coupled to antenna structures 40 using a balun. Near-field communications circuitry 42 may have a differential output. The balun may convert differential output (signals referenced to each other) from circuitry 42 to single-ended signals (signals referenced to ground) for feeding the near-field communications antenna formed from antenna structures 40.

Tunable circuitry 52 may be formed from one or more tunable circuits such as circuits based on capacitors, resistors, inductors, and switches. Tunable circuitry 52 and filter circuitry in antenna structures 40 may be implemented using discrete components mounted to a printed circuit such as a rigid printed circuit board (e.g., a printed circuit board formed from glass-filled epoxy) or a flexible printed circuit formed from a sheet of polyimide or a layer of other flexible polymer, a plastic carrier, a glass carrier, a ceramic carrier, or other dielectric substrate. During operation of device 10, control circuitry 28 may issue commands on path 66 to adjust switches, variable components, and other adjustable circuitry in tunable circuitry 52, thereby tuning antenna structures 40. If desired, tunable circuitry 52 may include one or more inductors. A switch circuit may be used to selectively switch a desired number of the inductors into use. By varying the inductance of tunable circuitry 52 in this way, antenna structures 40 can be tuned to cover desired communications bands. Tunable circuitry 52 may also include one or more capacitors that are selectively switched into use with a switching circuit to tune antenna structures 40. Capacitance adjustments and inductance adjustments may be made using a tunable circuit with adjustable capacitors and inductors and/or separately adjustable capacitor circuits and inductor circuits may be used in tuning antenna structures 40.

Figure 4:
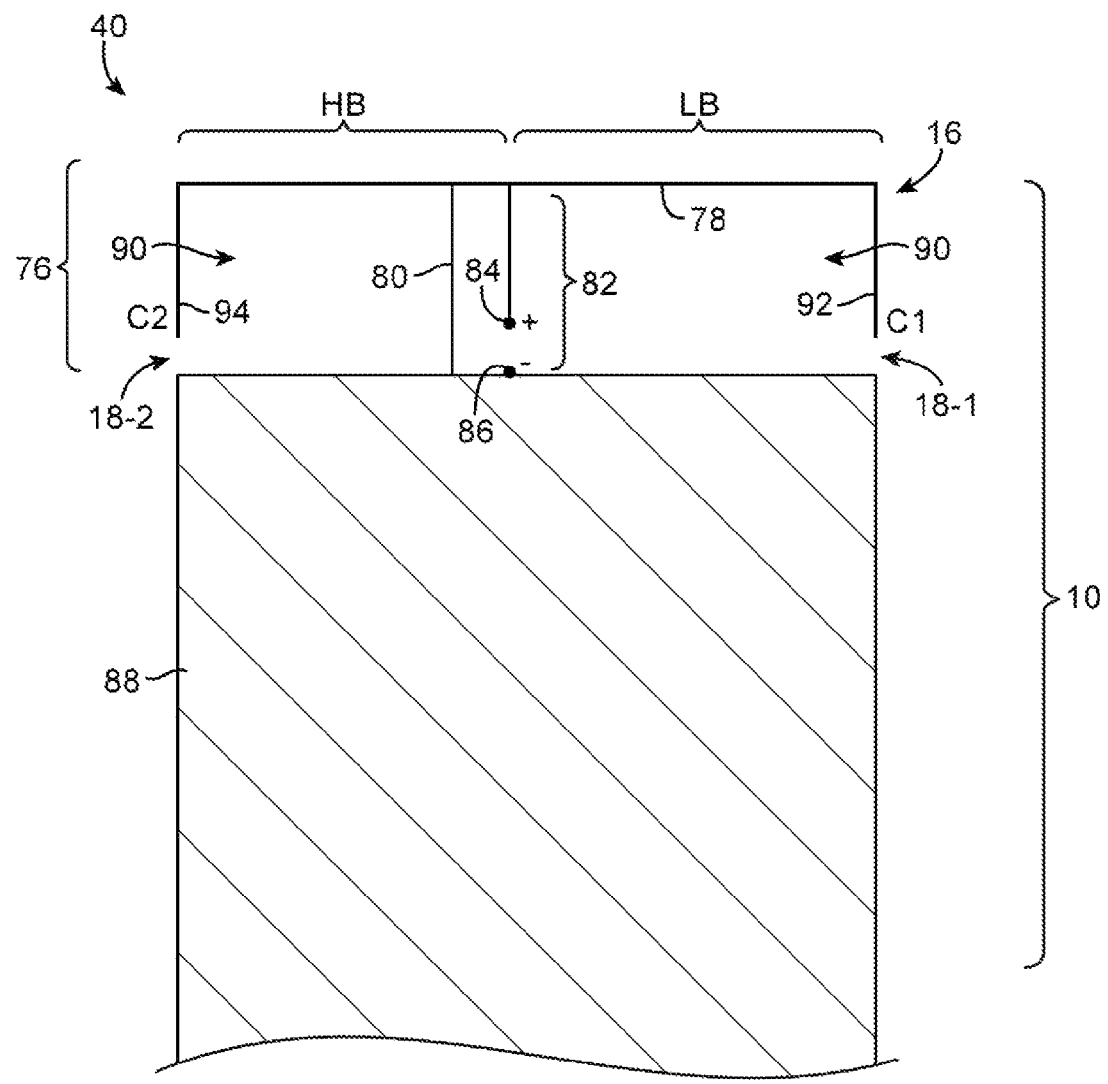
FIG. 4 is a diagram of an illustrative electronic device with antenna structures in accordance with an embodiment.

Antenna structures 40 may be used in forming a non-near-field antenna based on inverted-F antenna design or antenna structures with other designs. An illustrative configuration for electronic device 10 that incorporates inverted-F antenna structures 40 is shown in FIG. 4. As shown in FIG. 4, antenna structures 40 may include inverted-F antenna resonating element 76 and antenna ground 88. Antenna ground 88 may be formed from ground traces on a flexible printed circuit, ground traces on a rigid printed circuit board, metal traces on other dielectric carriers, portions of an electronic device housing such as a metal midplate structure or internal frame structures, conductive structures such as metal portions of electrical components in device 10, or other conductive structures. Inverted-F antenna resonating element 76 may be formed from a segment of peripheral conductive housing structures 16 (e.g., a segment of a metal band or other metal member that surrounds display 14, etc.), other metal housing structures, metal portions of electronic components in device 10, metal traces on printed circuit substrates, plastic carriers, or other dielectric substrates, or other conductive structures.

Antenna resonating element 76 may include main antenna resonating element arm 78 (e.g., a segment of peripheral conductive housing structures 16 between respective peripheral conductive housing structure gaps such as gaps 18-1 and 18-2). Main antenna resonating element arm 78 may have one or more branches. For example, arm 78 may have a low band arm LB for producing a low communications band resonance and a high band arm HB for producing a high communications band resonance. Tip portion 94 of high band branch HB may be separated by gap 18-2 from ground plane 88 and may have an associated capacitance C2. Tip portion 92 of low band branch LB may be separated by gap 18-1 from ground plane 88 and may have associated capacitance C1. The size and shapes of the metal structures adjoining gaps 18-1 and 18-2 may be configured to adjust the values of C1 and C2 and thereby adjust antenna performance. If desired, optional inductors may span gaps 18-1 and 18-2 (e.g., to adjust antenna frequency response and/or provide a current path for forming a near-field communications loop antenna).

Arm 78 may be separated from ground plane 88 by a dielectric-filled opening such as gap 90. Gap 90 may contain plastic, glass, ceramic, air, or other dielectric materials. Non-near-field communications antenna return path 80 in the non-near-field communications antenna of antenna structures 40 may bridge gap 90. Non-near-field communications antenna feed path 82 may bridge gap 90 in parallel with return path 80. Antenna feed terminals such as positive antenna feed terminal 84 and ground antenna feed terminal 86 may form a non-near-field communications antenna feed within antenna feed path 82. The conductive structures of antenna return path 80 and antenna feed path 82 may be formed from metal traces on printed circuits, metal traces on plastic carriers, conductive housing structures, or other conductive structures in device 10.

Impedance matching circuitry, filter circuitry, and tuning circuitry 52 of FIG. 3 may be interposed in paths that bridge gap 90 such as path 80, feed path 82, or one or more parallel tuning paths, may bridge gaps such as gaps 18-1 and 18-2 at the tips of main antenna resonating element arm 78 of antenna resonating element 76, may be formed in other portions of antenna resonating element 76 and/or may be incorporated into ground structures such as antenna ground 88.

To support near-field communications in device 10, device 10 preferably includes a near-field communications antenna. Space can be conserved by using some or all of antenna structures 40 both as a cellular telephone antenna or other non-near-field-communications antenna and as a near-field communications antenna. As an example, a near-field communications antenna for device 10 (e.g., an antenna that is used by near-field communications circuitry 42 of FIG. 2 to support communications with external equipment 58 over link 64) may be formed using portions of the antenna structures of FIG. 4 such as portions of antenna resonating element 76 and antenna ground 88. By sharing conductive antenna structures between both near-field and non-near-field antennas, duplicative conductive structures can be minimized and antenna volume can be conserved within device 10.

Figure 5:
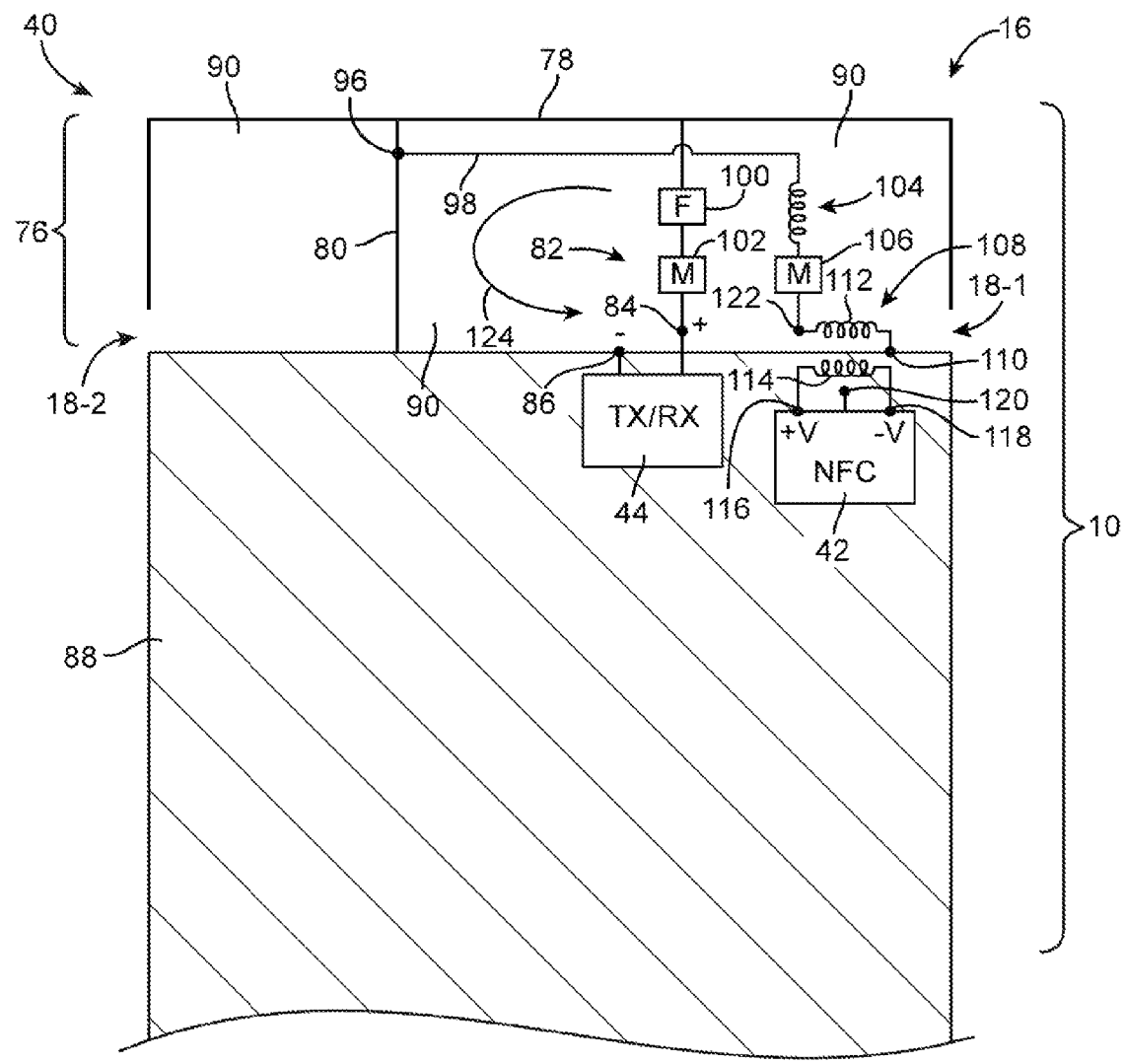
FIG. 5 is a diagram of an electronic device having antenna structures that can be used to handle both non-near-field communications and near-field communications and that include a balun coupled to an antenna return path with a signal path that runs parallel to a peripheral conductive housing member in accordance with an embodiment.

An illustrative configuration that may be used in device 10 to allow antenna structures 40 to serve both as a near-field communications antenna and a non-near-field communications antenna is shown in FIG. 5. In the illustrative configuration of FIG. 5, antenna structures 40 include antenna resonating element 76 and antenna ground 88. Antenna resonating element arm 78 of antenna resonating element 76 is separated from antenna ground 88 by gap 90. Path 80 spans gap 90 in parallel with antenna feed path 82. Positive antenna feed terminal 84 and ground antenna feed terminal 86 form an antenna feed that is coupled to non-near-field communications circuitry 44 (e.g., a non-near-field communications transceiver such as a cellular telephone transceiver, wireless local area network transceiver, etc.). Ground antenna feed terminal 86 is coupled to antenna ground 88. Circuits such as impedance matching circuit 102 and filter 100 may, if desired, be incorporated into antenna structures 40 (e.g., in antenna feed path 82 or elsewhere in structures 40). When it is desired to transmit and/or receive non-near-field communications signals with antenna structures 40, antenna resonating element arm 78, antenna return path 80, antenna feed path 82, and antenna ground 88 (and, if desired, other structures) serve as a non-near-field communications antenna (i.e., an inverted-F antenna) that is used by non-near-field communications circuitry 44.

Near-field communications circuitry 42 (e.g., a near-field communications transceiver operating at 13.56 MHz or other suitable near-field communications frequency) may be coupled to antenna structures 40 using balun 108. Near-field communications circuitry 42 may have a ground terminal 120 that is coupled to antenna ground 88. Terminals 116 and 118 of circuitry 42 form a pair of differential signal terminals. The differential signal terminals are coupled to balun 108.

Balun 108 may contain coupled inductors 114 and 112. Inductors 114 and 112 may be coupled by near-field electromagnetic coupling (i.e., inductors 114 and 112 form a transformer and are magnetically coupled). Inductor 114 may have a first terminal coupled to positive terminal 116 (+V) of near-field communications circuit 42 and may have a second terminal coupled to negative terminal 118 (−V) of near-field communications circuit 42. Inductor 112 may have a first terminal such as terminal 110 that is coupled to antenna ground 88. Inductor 112 may also have a second terminal such as terminal 122 that couples inductor 112 to optional matching circuit 106 and inductor 104. Matching circuit 106 may be used for impedance matching. Inductor 104 may be used to help tune the performance of antenna structures 40 when used as a near-field communications antenna. Conductive path 98 (e.g., a path that runs parallel to arm 78 and/or that includes portions of arm 78) is used to couple inductor 104 to node 96 on antenna return path 80.

During operation of near-field communications circuit 42, differential signals across terminals 116 and 118 are transmitted and received by a near-field communications antenna formed from a signal path that includes inductor 112, circuits 106 and 104, path 98, return path 80, and antenna ground 88. The signal path forms a loop supporting antenna currents. Accordingly, the near-field communications antenna of FIG. 5 is sometimes referred to as a loop antenna. During near-field communications, the loop antenna carries loop currents, as illustrated by loop current 124. The loop currents are associated with near-field electromagnetic signals (see, e.g., wireless signals 64 of FIG. 3). Balun 108 serves as a differential-to-single-ended converter that converts differential signals appearing across differential terminals 116 and 118 to single-ended loop current signals 124 flowing through the near-field communications antenna in antenna structures 40 (i.e., the loop formed from balun inductor 112, optional matching circuit 106 and optional filter circuit 100, path 98, return path 80, and antenna ground 88).

As the example of FIG. 5 demonstrates, portions of antenna structures 40 such as return path 80 and portions of antenna ground 88 and other structures 40 can be shared between a non-near-field communications antenna (e.g., an inverted-F antenna) and a near-field communications antenna (e.g., a loop antenna), thereby helping to minimize antenna volume for device 10.

Figure 6:
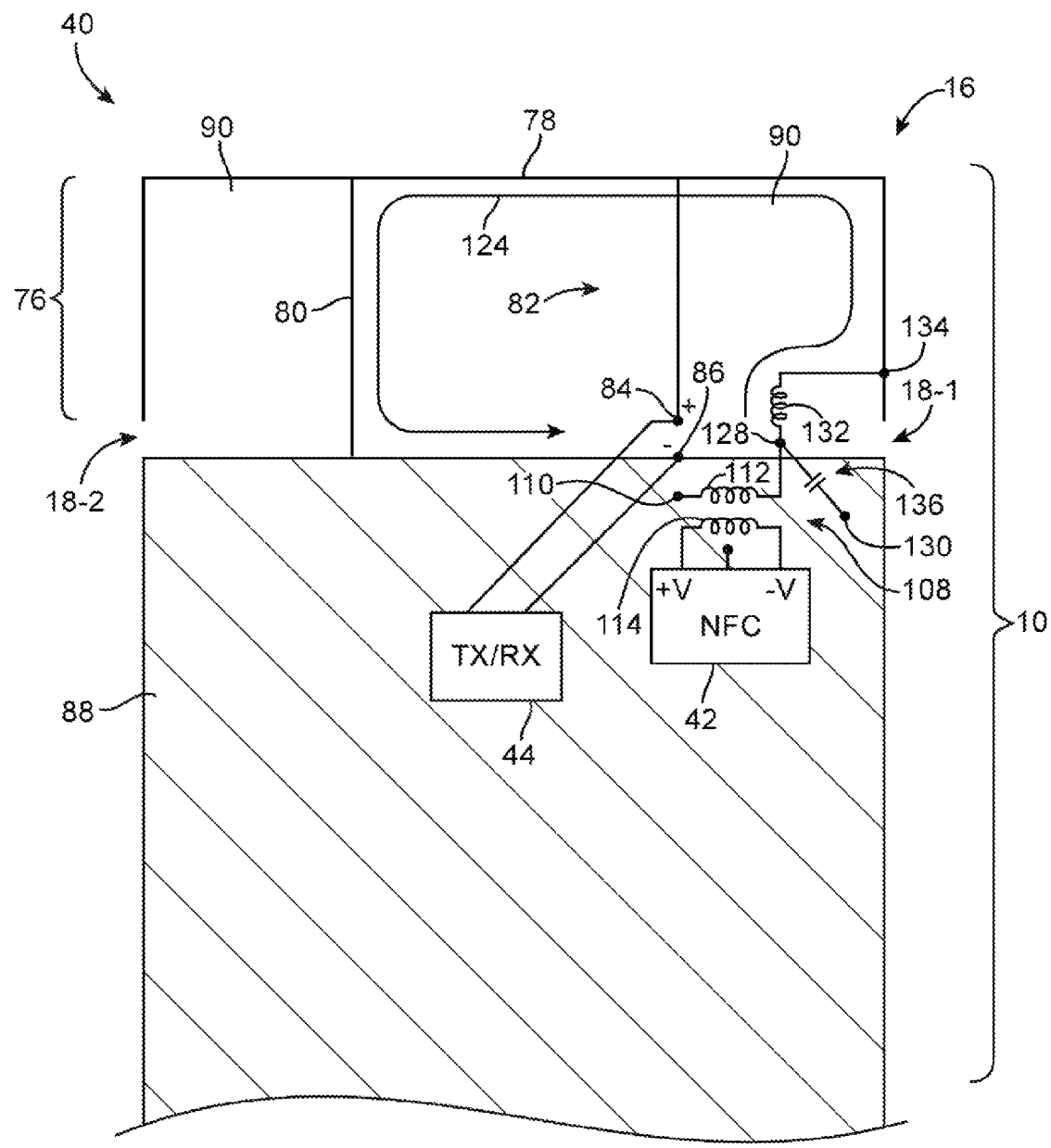
FIG. 6 is a diagram of an electronic device having antenna structures that can be used to handle both non-near-field communications and near-field communications and that include a balun coupled to a conductive peripheral electronic device housing structure in the antenna structures in accordance with an embodiment.

Another illustrative configuration for antenna structures 40 that allows antenna structures 40 to serve both as a non-near-field communications antenna such as an inverted-F antenna and as a near-field communications antenna such as a loop antenna is shown in FIG. 6. In the illustrative arrangement of FIG. 6, non-near-field communications circuitry 38 is coupled to antenna feed terminals 84 and 86 in antenna feed path 82 of an inverted-F antenna that is formed from antenna resonating element 76 and antenna ground 88. This allows antenna structures 40 to serve as a non-near-field communications antenna when it is desired to transmit and receive non-near-field communications signals with circuitry 44. Near-field communications circuitry 42 is coupled to antenna structures 40 using balun 108. Balun 108 includes inductors 114 and 112. Inductor 114 is connected to a pair of differential signal terminals in circuit 42. Terminal 110 of inductor 112 is coupled to antenna ground 88. Inductor 112 also has an opposing terminal coupled to node 128. Capacitor 136 or other circuitry for tuning the response of antenna structures 40 may be coupled between node 128 and terminal 130. Terminal 130 may be connected to antenna ground 88. Inductor 132 or other circuitry for tuning the response of antenna structures 40 may be coupled between node 128 and terminal 134 on antenna resonating element arm 78. Antenna resonating element arm 78 may be formed from a segment of peripheral conductive housing structures 16. When operated in a near-field communications mode using near-field communications circuitry 42, antenna structures 40 of FIG. 6 form a loop antenna that handles near-field communications signals such as loop current 124. The loop antenna is formed from a loop-shaped signal path that includes balun inductor 112, inductor 132, the segment of arm 78 between terminal 134 and return path 80 (e.g., the segment of peripheral conductive housing structures 16 between terminal 134 and return path 80), return path 80, and antenna ground 88.

Figure 7:
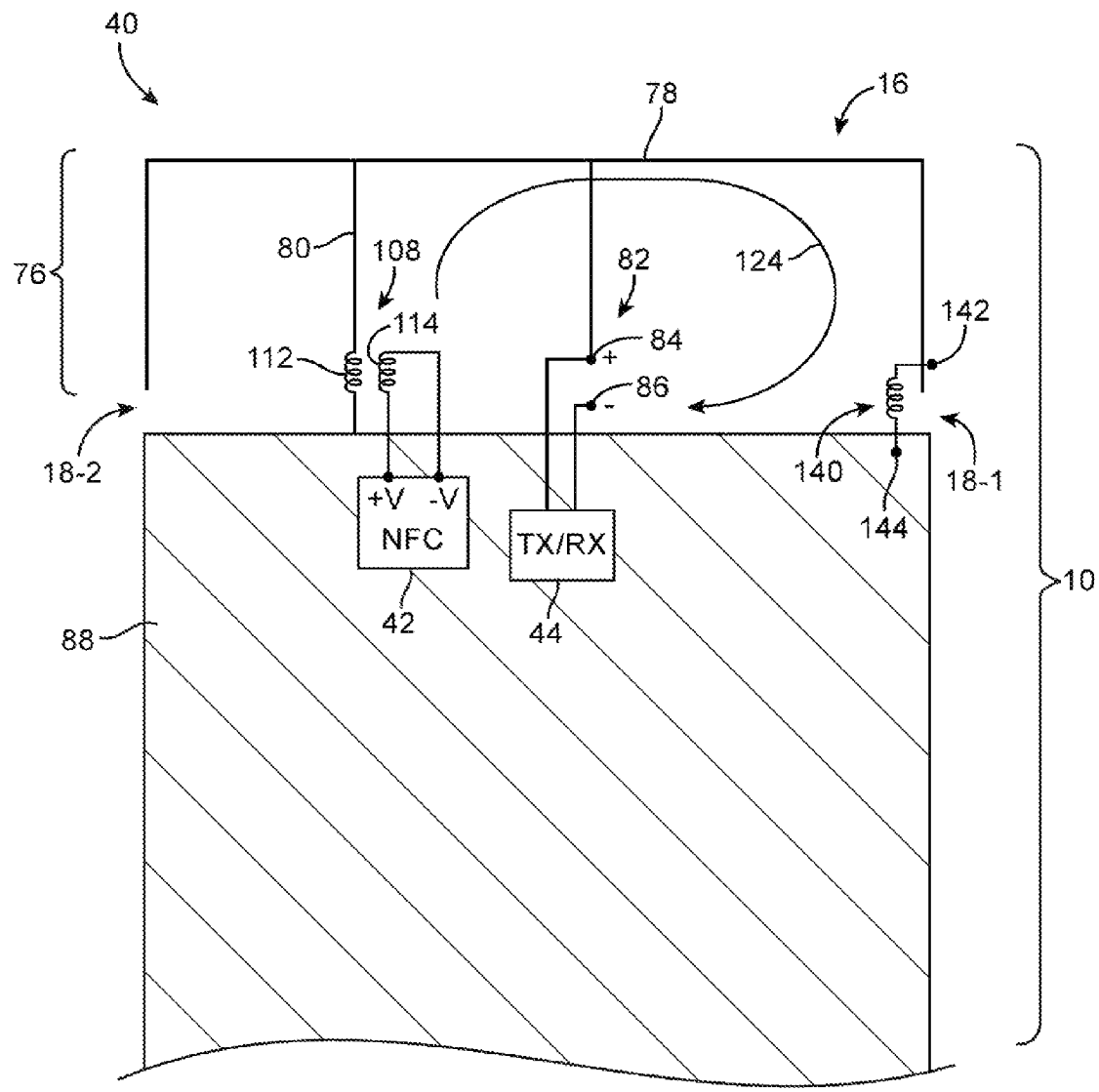
FIG. 7 is a diagram of an electronic device having antenna structures that can be used to handle both non-near-field communications and near-field communications and that include a balun coupled to an antenna return path in accordance with an embodiment.

In the illustrative configuration of FIG. 7, balun 108 is used to couple near-field communications circuit 42 to antenna structures 40 in non-near-field communications antenna return path 80. As shown in FIG. 7, balun 108 includes inductor 114, which is coupled across the differential signal terminals of near-field communications circuitry 42 and includes inductor 112, which is interposed within return path 80 and is electromagnetically coupled to inductor 114. Inductor 140 has a first terminal coupled to antenna resonating element arm 78 (e.g., peripheral conductive housing structures 16) at node 142 and a second terminal coupled to antenna ground 88 at node 144. Inductor 140 spans gap 18-1. At non-near-field communications frequencies, the impedance of inductor 140 is high (i.e., inductor 140 forms an open circuit). At lower frequencies such as those associated with near-field communications, inductor 140 forms a short circuit that electrically couples nodes 142 and 144.

When it is desired to transmit and/or receive near-field communications signals with antenna structures 40 using near-field communications circuitry 42, loop currents such as loop current 124 flow through a near-field communications loop antenna that is formed from inductor 112, return path 80, the portion of arm 78 between return path 80 and node 142, inductor 140 spanning gap 18-1, and a portion of antenna ground 88. When it is desired to transmit and/or receive non-near-field communications signals with antenna structures 40 using non-near-field communications circuitry 44, structures 40 can be feed using terminals 84 and 86 in non-near-field communications antenna feed path 82.

Figure 8:
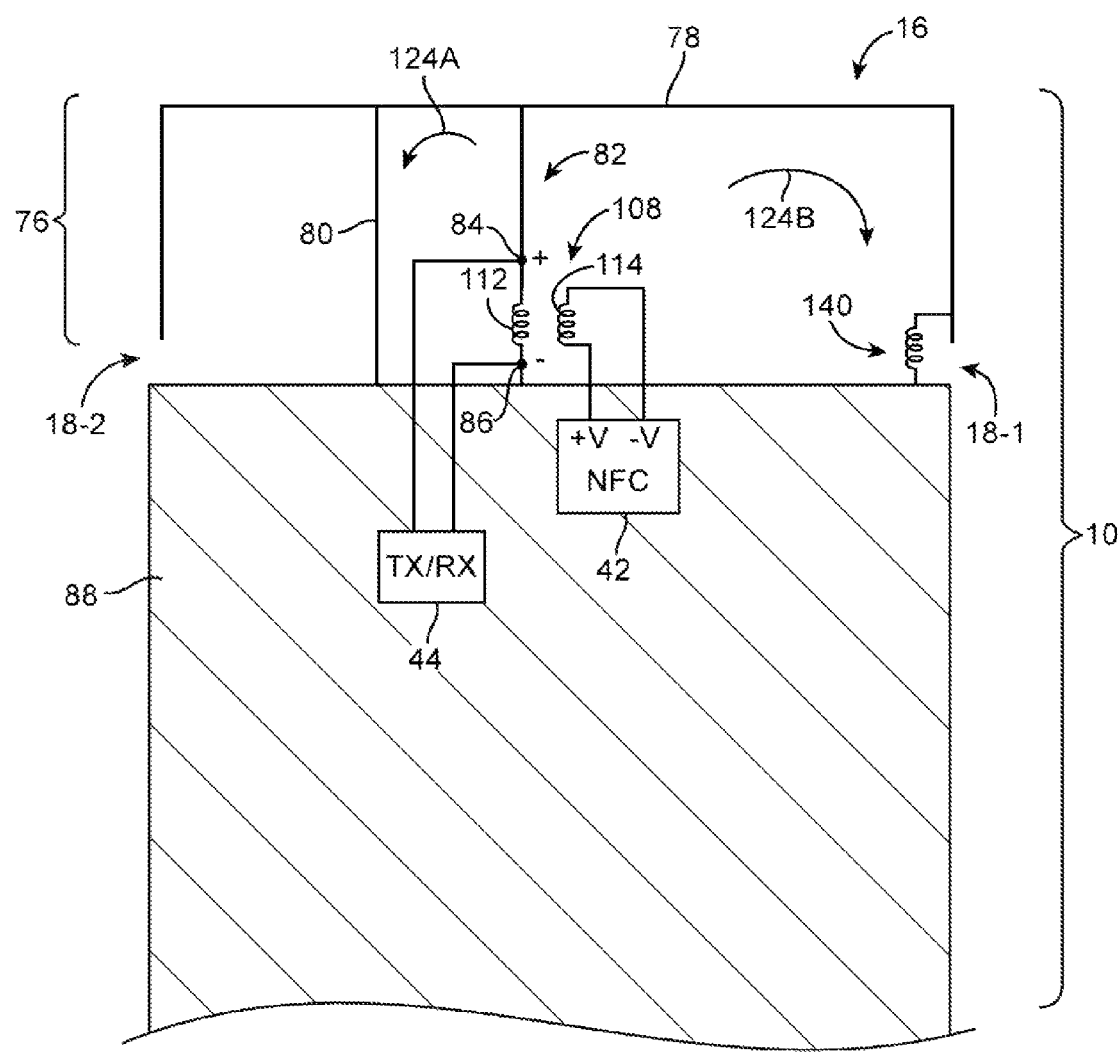
FIG. 8 is a diagram of an electronic device having antenna structures that can be used to handle both non-near-field communications and near-field communications and that include a balun coupled to an antenna feed path in accordance with an embodiment.

FIG. 8 is a diagram of electronic device 10 showing an illustrative configuration that may be used for antenna structures 40 in which balun 108 couples near-field communications circuitry 42 to feed path 82. As shown in FIG. 8, antenna resonating element 76 for a non-near-field communications antenna such as an inverted-F antenna may be formed from antenna resonating element arm 78, non-near-field communications antenna return path 80, and non-near-field communications antenna feed path 82. Non-near-field communications circuitry 44 may be coupled to an antenna feed formed from positive antenna feed terminal 84 and ground antenna feed terminal 86 in antenna feed path 82.

Balun 108 of FIG. 8 may include inductor 114, which is coupled across a pair of differential signal terminals (+V, −V) in near-field communications circuitry 42. Balun 108 may also include inductor 112. Inductors 112 and 114 may be electromagnetically coupled. As shown in FIG. 8, inductor 112 of balun 108 may be interposed within antenna feed path 82. In particular, inductor 112 may span antenna feed terminals 84 and 86. A first terminal of inductor 112 may be coupled to positive antenna feed terminal 84 and a second terminal of inductor 112 may be coupled to ground antenna feed terminal 86.

At relatively high non-near-field communications frequencies (e.g., at cellular frequencies, wireless local area network frequencies, etc.), the impedance of inductor 112 will be high and will form an open circuit between terminals 84 and 86. This allows antenna structures 40 to serve as a non-near-field communications antenna (i.e., an inverted-F antenna formed from resonating element 76 and antenna ground 88) for handling wireless communications associated with non-near-field communications circuitry 44. At lower frequencies such as those associated with near-field communications frequencies, the impedance of inductor 112 will be low, forming a short circuit between terminals 84 and 86. This allows structures 40 to form a near-field communications loop antenna for handling near-field communications signals transmitted and/or received using near-field communications circuitry 42. The loop antenna may support loop currents such as loop currents 124A and/or 126A. For example, a loop antenna may be formed by inductor 112, antenna feed path 82, portions of arm 78, return path 80, and antenna ground 88 to support loop currents 124A and/or a loop antenna may be formed by inductor 112, antenna feed path 82, portions of arm 78, optional inductor 140 spanning gap 18-1, and antenna ground 88.

Figure 9:
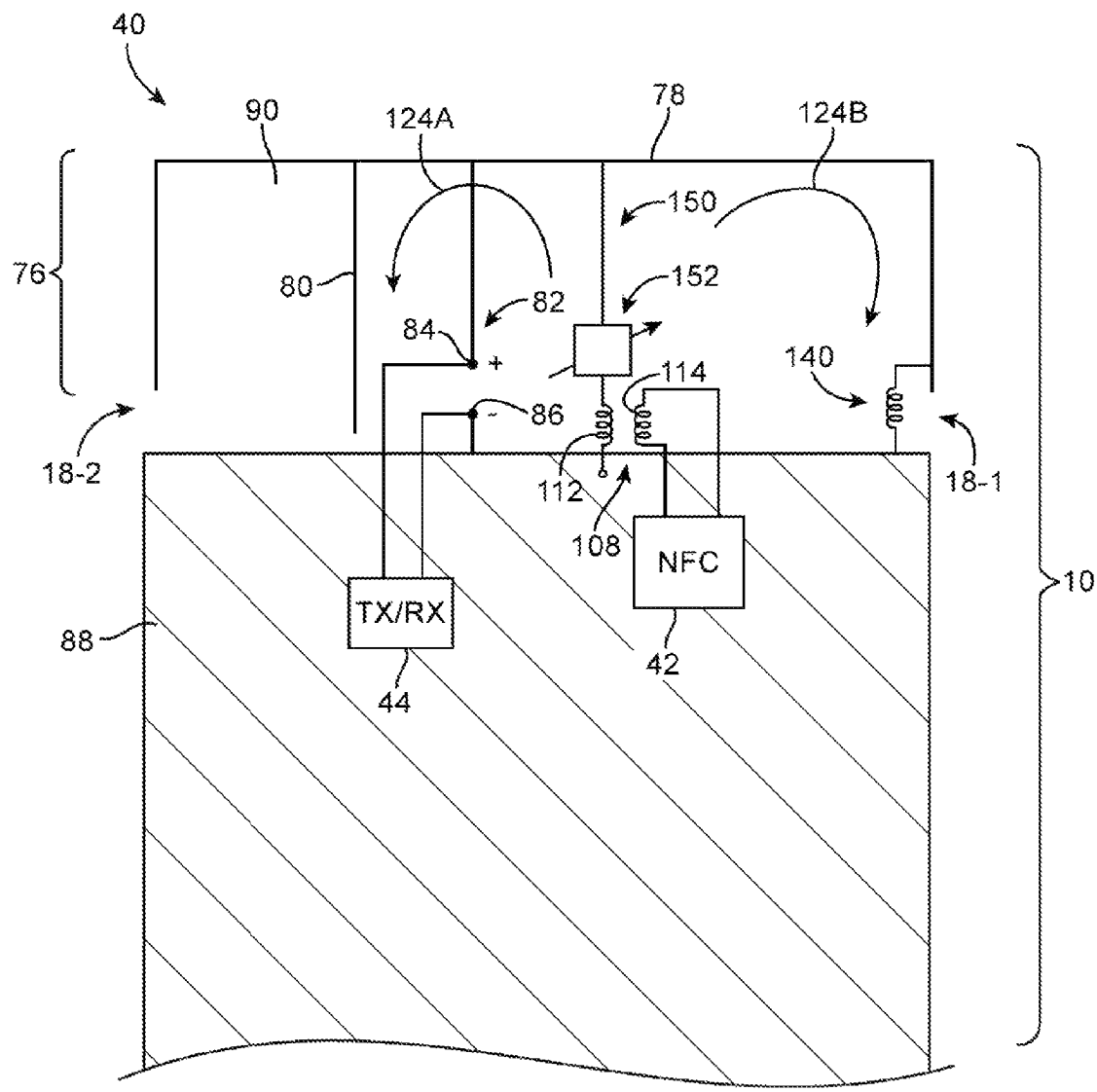
FIG. 9 is a diagram of an electronic device having antenna structures that can be used to handle both non-near-field communications and near-field communications and that include a balun coupled to an antenna tuning path in accordance with an embodiment.

If desired, balun 108 may be used to couple near-field communications circuitry 42 to antenna structures 40 using portions of an antenna tuning path such as antenna tuning path 150 of FIG. 9. In the illustrative configuration of FIG. 9, antenna structures 40 include antenna resonating element 76 and antenna ground 88. Non-near-field communications circuitry 44 is coupled to terminals 84 and 86 in antenna feed path 82. Near-field communications circuitry 42 is coupled to antenna structures 40 using balun 108. Balun 108 has an inductor such as inductor 114 that has terminals coupled across a pair of differential signal terminals in near-field communications circuit 42. Balun 108 also has an inductor such as inductor 112 that is electromagnetically coupled to inductor 114. In the example of FIG. 9, inductor 112 has a first terminal coupled to antenna ground 88 and a second terminal coupled to tunable circuit 152 in antenna tuning path 150.

During operation in non-near-field communications mode, antenna structures 40 form an inverted-F antenna using inverted-F antenna resonating element 76 and antenna ground 88. Path 80 forms an inverted-F antenna return path between main resonating element arm 78 of inverted-F antenna resonating element 76 and antenna ground 88. Antenna feed path 82 is coupled in parallel with return path 80 across gap 90. Antenna tuning path 150 includes tunable circuit 152 (e.g., tunable inductors, capacitors, etc.). Tunable circuitry 152 may be tuned by control circuitry 28 to adjust the performance of the inverted-F antenna in real time (e.g., to tune the resonances of the inverted-F antenna to cover communications bands of interest). In the example of FIG. 9, antenna tuning path 150 is coupled across gap 90 in parallel with return path 80 and feed path 82. This is merely illustrative. Tunable circuitry 152 may be incorporated elsewhere within antenna structures 40, if desired.

During operation in near-field communications mode, antenna structures 40 form a loop antenna for supporting near-field communications signals. The loop antenna may be formed from tuning path 150 (i.e., inductor 112 and tunable circuitry 152), resonating element arm 78, return path 80, and antenna ground 88, as illustrated by loop current path 124A and/or may be formed from tuning path 150 (i.e., inductor 112 and tunable circuitry 152), arm 78, inductor 140 spanning gap 18-1, and antenna ground 88, as illustrated by loop current path 124B. A loop antenna may also be formed from tuning path 150 (i.e., inductor 112 and tunable circuitry 152), arm 78, feed path 82, and antenna ground 88 (e.g., by incorporating an inductor into path 82 across terminals 84 and 86, as described in connection with FIG. 8). Other configurations for antenna structures 40 may also be used that support the formation of a non-near-field communications antenna that is coupled to non-near-field communications circuitry 44 at non-near-field communications antenna feed terminals 84 and 86 and that support the formation of a near-field communications loop antenna that is coupled to near-field communications circuitry 42 by balun 108. The configurations of FIGS. 5, 6, 7, 8, and 9 are merely illustrative. Moreover, additional circuit components (e.g., fixed and/or tunable capacitors and inductors, etc.) may be interposed in antenna structures 40 if desired.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
    antenna structures that include an inverted-F antenna having a resonating element arm, an antenna ground, an antenna feed path, and an antenna return path coupled between the resonating element arm and the antenna ground;
    non-near-field communications circuitry coupled to the antenna structures;
    near-field communications circuitry, wherein the near-field communications circuitry handles near-field communications using a loop antenna formed from the antenna structures, the loop antenna including a portion of the antenna return path of the inverted-F antenna; and
    a balun that couples the near-field communications circuitry to the antenna structures.

2. The electronic device defined in claim 1 wherein the loop antenna further includes a portion of the antenna ground.

3. The electronic device defined in claim 2 wherein the non-near-field communications circuitry handles non-near-field communications circuitry using the inverted-F antenna.

4. The electronic device defined in claim 3 wherein the antenna feed path is coupled between the resonating element arm and the antenna ground.

5. The electronic device defined in claim 1 wherein the loop antenna further includes a portion of the resonating element arm of the inverted-F antenna.

6. The electronic device defined in claim 1 wherein the loop antenna further includes a portion of the antenna feed path.

7. The electronic device defined in claim 6 wherein the antenna feed path has an antenna feed formed from a positive antenna feed terminal and a ground antenna feed terminal and an inductor is coupled between the positive antenna feed terminal and the ground antenna feed terminal.

8. The electronic device defined in claim 7 wherein the balun has first and second electromagnetically coupled inductors and the inductor that is coupled between the positive antenna feed terminal and the ground antenna feed terminal is the first inductor.

9. The electronic device defined in claim 8 wherein the near-field communications circuitry has first and second differential signal terminals and the second inductor is coupled between the first and second differential signal terminals.

10. The electronic device defined in claim 1 further comprising an antenna tuning path in the inverted-F antenna that tunes the inverted-F antenna, wherein the loop antenna further includes a portion of the antenna tuning path.

11. The electronic device defined in claim 1 further comprising peripheral conductive housing structures, wherein the resonating element arm of the inverted-F antenna is formed from a portion of the peripheral conductive housing structures.

12. The electronic device defined in claim 11 wherein the peripheral conductive housing structures are separated from the antenna ground by an opening that is spanned by an antenna return path that connects the resonating element arm to the antenna ground and the resonating element arm has a tip that is separated from the antenna ground by a gap in the peripheral conductive housing structures.

13. An electronic device, comprising:
    an antenna resonating element and antenna ground that form a non-near-field communications antenna;
    non-near-field communications circuitry coupled to the non-near-field communications antenna, wherein the non-near-field communications circuitry wirelessly communicates using the non-near-field communications antenna;
    near-field communications circuitry; and
    a balun coupled to the near-field communications circuitry, wherein the balun includes an inductor, the near-field communications circuitry wirelessly communicates using a near-field communications antenna, and the near-field communications antenna is formed from the inductor, a portion of the antenna resonating element, and a portion of the antenna ground.

14. The electronic device defined in claim 13 wherein the antenna resonating element comprises an inverted-F antenna resonating element.

15. The electronic device defined in claim 14 further comprising conductive electronic device housing structures, wherein the antenna resonating element is formed at least partly from the conductive electronic device housing structures.

16. The electronic device defined in claim 15 wherein the inductor is interposed in an antenna return path that is coupled between the antenna ground and a resonating element arm in the antenna resonating element.

17. The electronic device defined in claim 15 wherein the inductor is interposed in a path that is connected to an antenna return path and wherein the antenna return path is coupled between the antenna ground and a resonating element arm in the antenna resonating element.

18. The electronic device defined in claim 15 wherein the inductor is coupled in a path in the antenna resonating element that contains adjustable antenna tuning circuitry.

19. The electronic device defined in claim 15 wherein the non-near-field communications circuitry comprises a cellular telephone transceiver and the non-near-field communications antenna comprises an antenna feed coupled to the cellular telephone transceiver.

20. Apparatus, comprising:
    an antenna ground;
    conductive peripheral electronic device housing structures separated from the ground by an opening;
    a non-near-field communications antenna return path that spans the opening;
    a non-near-field communications antenna feed path that spans the opening, wherein the antenna ground, the conductive peripheral electronic device housing structures, the non-near-field communications antenna return path, and the non-near-field communications antenna feed path form a non-near-field communications antenna;
    a balun having a first inductor and having a second inductor that is electromagnetically coupled to the first inductor; and
    a near-field communications loop antenna that includes the first inductor and the antenna ground.

21. The apparatus defined in claim 20 further comprising:
    a cellular telephone transceiver coupled to the non-near-field communications antenna feed path; and a near-field communications transceiver having first and second differential signal terminals coupled to respective first and second terminals of the second inductor.

\* \* \* \* \*